United States Patent

[11] 3,585,280

[72] Inventor Renville H. McMann, Jr.
New Canaan, Colo.
[21] Appl. No. 832,404
[22] Filed June 11, 1969
[45] Patented June 15, 1971
[73] Assignee Columbia Broadcasting System, Inc.
New York, N.Y.

[54] GAIN CORRECTION APPARATUS FOR COLOR PICTURE INFORMATION SIGNALS REPRODUCED FROM A RECORD MEDIUM
5 Claims, 1 Drawing Fig.

[52] U.S. Cl. .......... 178/5.2, 178/5.4
[51] Int. Cl. .......... H04n 9/48
[50] Field of Search .......... 178/5.2, 5.4, 5.2 A, 5.2 D, 7.2, 6.7, 6.7 A, 5.4

[56] References Cited
UNITED STATES PATENTS
3,479,447 11/1969 Goldmark et al. .......... 178/5.2

*Primary Examiner*—Robert L. Richardson
*Attorney*—Brumbaugh, Graves, Donohue & Raymond

ABSTRACT: In the illustrative embodiment of the invention described herein, the superimposed pilot signal of a color information signal is supplied to a detector which produces a pulse each time the pilot signal crosses its zero axis. The pulses are delayed in time to align the pulses with the pilot signal at 90° from the axis crossing points and the delayed pulses are thereafter utilized to enable a sampling gate to which the pilot signal is also supplied. The output signal from the gate is smoothed and then supplied across a potentiometer to a variable gain amplifier to which the color carrier signal components of the color information signal are supplied to eliminate amplitude fluctuations in the color carrier signal components.

PATENTED JUN 15 1971
3,585,280
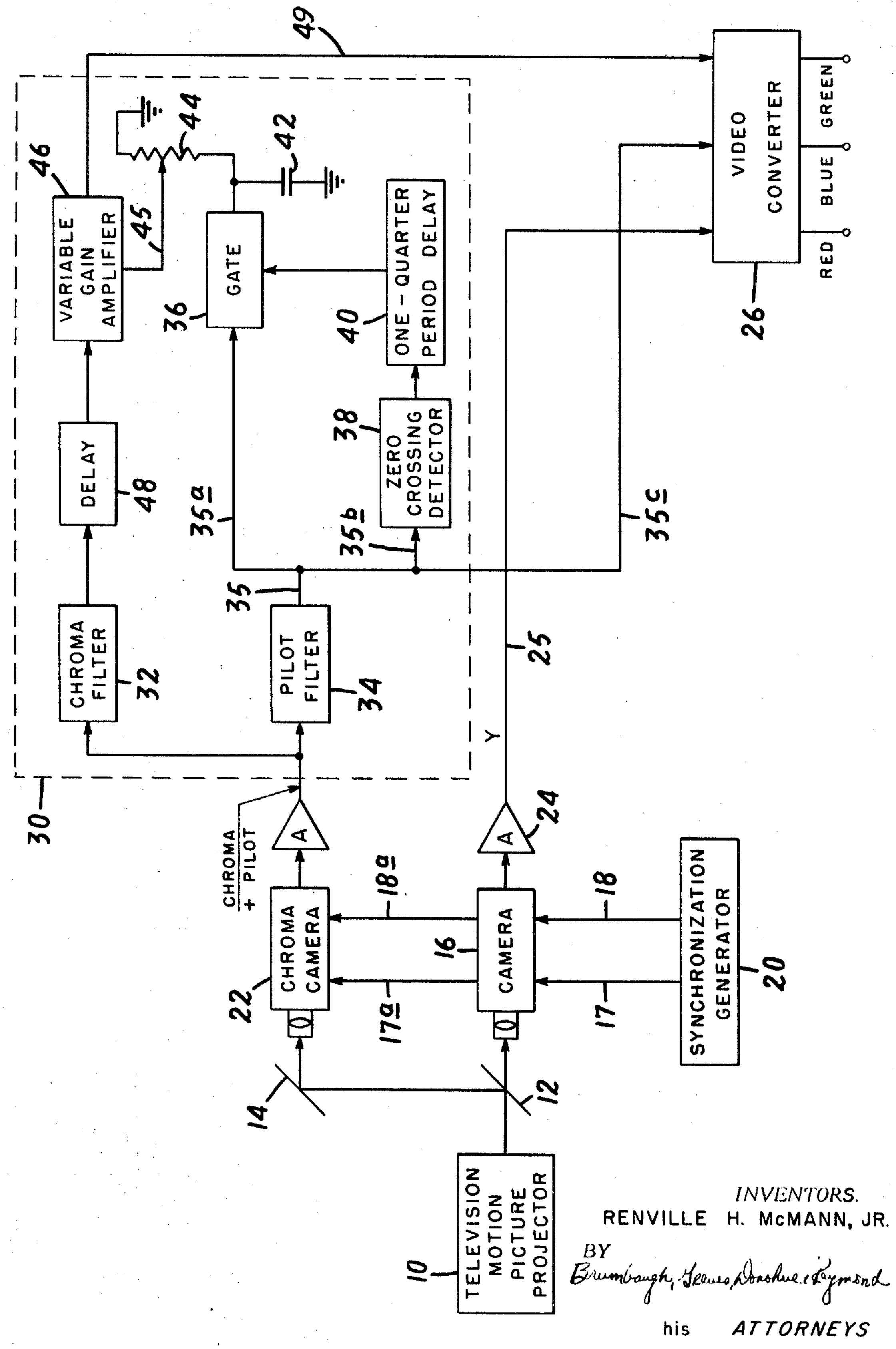
INVENTORS.
RENVILLE H. McMANN, JR.
BY Brumbaugh, Graves, Donohue & Raymond
his ATTORNEYS

GAIN CORRECTION APPARATUS FOR COLOR PICTURE INFORMATION SIGNALS REPRODUCED FROM A RECORD MEDIUM

BACKGROUND OF THE INVENTION

This invention relates to apparatus for reproducing color picture information signals recorded in monochrome on a record medium in a succession of frames and, more particularly, to a new and improved correction circuit for correcting the color picture information signals reproduced by such apparatus.

In the pending patent application entitled "Color Film Recording and Reproducing Apparatus," Ser. No. 519,106, now abandoned assigned to the assignee of the present invention, there is described apparatus for recording luminance information in one frame portion of a film strip and coded color information in a separate frame portion of the same film strip. The luminance information may be in pictorial form and the color information takes the form of a record including a first carrier signal component modulated in phase and amplitude according to the color saturation and hue in the original scene and a superimposed pilot signal occurring at one-half the color carrier signal frequency. Also described in the application is apparatus for scanning the information recorded on the above-described type film strip to produce signals representing brightness and color. Generally, the apparatus includes a pair of cameras which are responsive to the light transmitted through the two frame portions, respectively, for developing a luminance signal and a chrominance signal, the chrominance signal including the modulated first carrier signal component and the pilot signal.

On occasion, the pictures reproduced from the signals developed by the above-described apparatus contain undesirable flicker. The reason for the flicker is that there is a certain amount of signal retention by the camera handling the chrominance information so that a preceding field produces a signal having an effect which tends to amplitude modulate the next chrominance field signal. Both the modulated first carrier signal component and the pilot signal are amplitude modulated because of this signal carryover.

SUMMARY OF THE INVENTION

Accordingly, it is an object of the present invention to provide a correction circuit which overcomes the above-mentioned problem of flicker in the pictures reproduced from the chrominance signals developed by apparatus of the above-described type.

This and other objects are accomplished by the correction apparatus of the present invention. The correction apparatus comprises a pair of filters for dividing the modulated first carrier signal and the pilot signal into separate channels and a detector circuit which detects predetermined amplitude variations in the pilot signal to produce correction pulses. Also included is a delay circuit for delaying the correction pulses for a predetermined period of time with respect to the pilot signal and a gate circuit which is responsive to the pilot signal and to the delayed correction pulses for transmitting selective portions of the pilot signal. The selectively transmitted portions of the pilot signal are thereafter utilized as gain control signals to vary the amplitude of the first modulated carrier signal to eliminate therefrom the flicker producing amplitude modulation.

In a preferred embodiment of the invention, the detector circuit comprises a zero-crossing detector and a potentiometer is provided to vary the amplitude of the transmitted portions of the pilot signal.

BRIEF DESCRIPTION OF THE DRAWINGS

In the drawing:

The FIGURE is a schematic block diagram of a system for reproducing color picture information signals from a record medium including a typical correction circuit therefore arranged according to the present invention.

DESCRIPTION OF THE PREFERRED EMBODIMENT

In the illustrative apparatus for scanning color picture information recorded on a record medium in a succession of frames, each frame having a portion carrying luminance picture information and a portion carrying color picture information, as shown in FIG. 1, there is provided a standard motion picture projector 10 which is adapted to operate at, for example, 24 frames per second with the usual three-two pulldown relationship. Preferably, the film contained in the projector 10 is one of the types described in the above-mentioned patent application entitled "Color Film Recording and Reproducing Apparatus," Ser. No. 519,106.

Generally, one type film comprises a succession of frames with each frame being divided into two adjacent parts containing luminance and color information respectively, from a single frame of an original color motion picture film. The brightness may be recorded optically or electronically with the top to bottom dimension of the picture extending in the direction of movement by the film strip. The color information preferably comprises a succession of parallel lines which extend transversely of the film and spaced longitudinally thereof with each line comprising a record of the modulation sidebands of a suppressed color carrier signal modulated as a function of the color information in the picture. Also recorded in each line is a pilot signal which is adapted to be utilized subsequently during playback to provide a carrier for extraction of the color information contained in the color modulation sidebands. Preferably, the pilot signal frequency is outside the frequency band occupied by the color sidebands and it may be one-half the color carrier frequency.

The projector 10 directs an image of the recorded information to a beam splitter which comprises a half mirror 12 and a full mirror 14. One-half the light from the projector 10 passes through the half mirror 12 to a standard vidicon camera 16 which may be operated under standard television broadcasting conditions, namely, at a horizontal line rate of 15,734 lines per second, and at a vertical frame rate of 29.97 frames per second. To this end, the camera 16 is supplied with suitable horizontal and vertical deflection and blanking signals over the conductors 17 and 18 from a synchronization generator 20. The other one-half the light from the projector 10 is reflected from the mirror 12 to the mirror 14 and from the latter to another standard monochrome television camera 22. A pair of branch conductors **17*a* and 18*a* of the conductors 17 and 18 supply synchronizing and blanking voltage signals to the camera 22 from the synchronization generator 20**.

The brightness picture signal output (Y) from the television camera 16 is supplied through an amplifier 24 and via a conductor 25 to a video converter 26 which may be of the type described in the above-mentioned patent application and accordingly, decodes the chrominance signals and encodes the decoded chrominance signals with the luminance signal to produce red, blue and green color component signals.

The chrominance signal output from the camera 22 with the superimposed pilot signal is similarly amplified by an amplifier 28 and supplied to a color picture information signal correction circuit 30 which is arranged according to the present invention. As above mentioned, the chrominance signal contains the color carrier modulation sidebands and the superimposed pilot signal preferably has a frequency which is one-half the frequency of the color carrier modulation sideband components. Also, because of the inherent memory of the camera 22, the chrominance signal and the pilot signal will, on occasion, be amplitude modulated. The modulation in the chrominance signal will produce flicker in a reproduced picture.

In the correction circuit 30, the color picture information signal is supplied concurrently to a chroma filter 32 and a pilot filter 34 which separate the chrominance and pilot signals.

From the filter 34, the pilot signal is supplied via a conductor 35 and its branch conductors 35*a*, 35*b* and 35*c*, respectively, concurrently to a gate circuit 36, a zero-crossing detector 38 and the video converter 26. The zero-crossing detector 38 may be of conventional construction and, accordingly, need not be described in detail herein. It suffices that the detector 38 produces a pulse, referred to herein as a "correction" pulse, each time the amplitude of the pilot signal varies by a predetermined amount; in this case when the pilot signal crosses its zero axis. As is understood, depending upon the transition, the pulses will have either positive or negative polarities. The correction pulses are then supplied to a one-quarter period delay circuit 40, which may be, for example, a conventional multivibrator. Accordingly, the delay circuit supplies delayed correction pulses which are 90° out-of-phase with the pilot signal axis crossing points and aligned with the maximum amplitude levels, both negative and positive, of the pilot signal.

From the one-quarter period delay circuit 40 the correction pulses are supplied as enabling signals to the enabling input terminal of the gate circuit 36. The pilot signal is supplied to the other input terminal of the gate circuit 36 and, accordingly, the gate circuit 36 selectively transmits the pilot signal during the time when the correction pulses are supplied to the gate circuit. Because of the 90° delay, the maximum half-cycle amplitude levels of the pilot signal will be transmitted by the gate circuit 36.

The selectively transmitted or pulsed pilot signals are then supplied across a capacitor 42 to develop a substantially constant voltage control signal. Where the amplitudes of the pulsed pilot signal remain constant, the amplitude of the control signal will remain constant. Where there are variations in the amplitudes of successive pulsed pilot signals, which are caused by the inherent memory of the camera 22, the control signal output across the capacitor 42 will include corresponding fluctuations. The constant voltage control signal is then supplied across a potentiometer 44 and via the center tap 45 of the potentiometer to the control input terminal of a variable gain amplifier 46. The input terminal of the variable gain amplifier 46 is coupled to a delay circuit 48 which delays the chrominance signal transmitted by the filter circuit 32 by an appropriate amount to align in time the chrominance signal with the control signal developed across the capacitor 42 and supplied to the control input terminal of the amplifier 46 via the potentiometer 44. The amplifier 46 is controlled by the voltage control signal and, accordingly, produces a chrominance signal having an amplitude which is varied in accordance with the amplitude of the control signal and accordingly, a chrominance signal which is free from flicker-producing modulation.

The corrected chrominance signals are then supplied to the video converter 26 via a conductor 49. In the video converter 26, the pilot signal is utilized to extract the modulation from the modulated carrier sidebands to provide color difference signals and thereafter the color difference signals are combined with the luminance signal to produce green, red and blue color component signals.

In the operation of the correction circuit 30, the separated pilot signal is supplied to the gate circuit 36 and the zero-crossing detector 38. The detector 38 develops correction pulses which are delayed by one-quarter periods and thereafter supplied to the gate circuit 36 to selectively enable the gate circuit 36 to transmit portions of the pilot signal supplied to the input terminal thereof. The pulsed pilot signal is thereafter smoothed by the capacitor 42 and fed through the potentiometer 44 to the variable gain amplifier 46 to control the gain thereof. The variable gain amplifier receives the chrominance signal through the delay circuit 48 which compensates for the delay produced in deriving the gain control signal from the pilot signal. The control voltage signal developed across the capacitor 42 fluctuates in accordance with the variations in amplitude of the pilot signal developed by the camera 22. Accordingly, the control signal will cause the gain of the amplifier 46 to vary in such a manner as substantially to compensate for the variations in the chrominance signal which produces flicker in a color picture reproduced from the color component signals.

Although the invention has been described herein with reference to a specific embodiment, many modifications and variations therein will readily occur to those skilled in the art. Accordingly, all such variations and modifications are included within the intended scope of the invention as defined by the following claims.

I claim:

1. A correction circuit for color information signals developed by camera means and including a first carrier component at a given frequency and a second carrier component at a frequency having a fixed relation to the given frequency comprising means for separating the first and second carrier components, detector means for detecting predetermined amplitude variations in the second carrier component for producing correction pulses, delay means for delaying the correction pulses a selected period of time with respect to the second carrier component; gate means responsive to the second carrier component and the delayed correction pulses for transmitting selective portions of the second carrier component and amplifier means responsive to the first carrier component and controlled by the selectively transmitted portions of the second carrier component for varying the amplitudes of the first carrier component in accordance with the amplitudes of the selectively transmitted portions of the second carrier component.

2. A correction circuit according to claim 1 wherein the detector means comprises zero-crossing detector circuit means for producing a correction pulse each time the second carrier component crosses its zero axis.

3. A correction circuit according to claim 2 further comprising integrating means responsive to the selectively transmitted portions of the second carrier component for developing a substantially constant control signal and variable impedance means for varying the amplitude of the substantially constant control signal.

4. A correction circuit according to claim 3 further comprising second delay means responsive to the first carrier component for delaying the first carrier component to align in time the first carrier component with the substantially constant control signal.

5. A correction circuit according to claim 3 wherein the delay means comprises one-quarter period delay means for aligning the correction pulses with the second carrier component at 90° from the axis crossing points thereof.

UNITED STATES PATENT OFFICE
CERTIFICATE OF CORRECTION

Patent No. 3,585,280 Dated June 15, 1971

Inventor(s) Renville H. McMann, Jr.

It is certified that error appears in the above-identified patent and that said Letters Patent are hereby corrected as shown below:

On the cover sheet [72], "New Canaan, Colo." should read -- New Canaan, Conn. --.

Signed and sealed this 1st day of August 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334.